Oct. 11, 1927. 1,645,225
A. BRZYKCY
ANIMAL TRAP
Filed Feb. 7, 1927 2 Sheets-Sheet 1
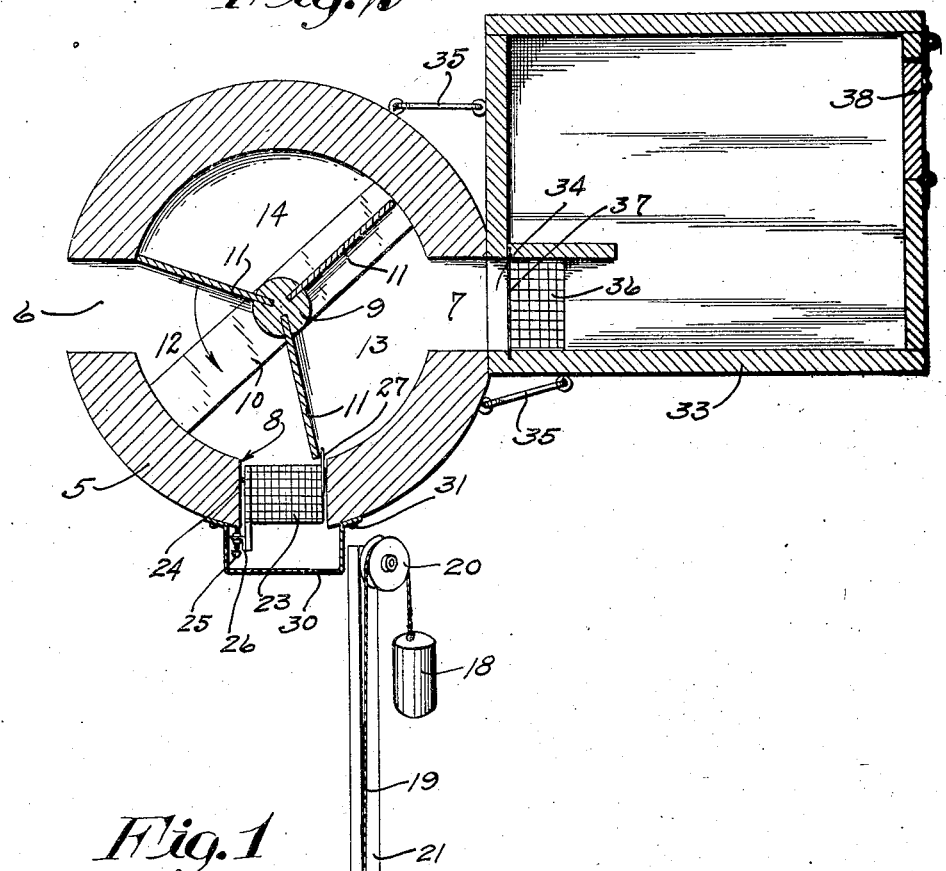
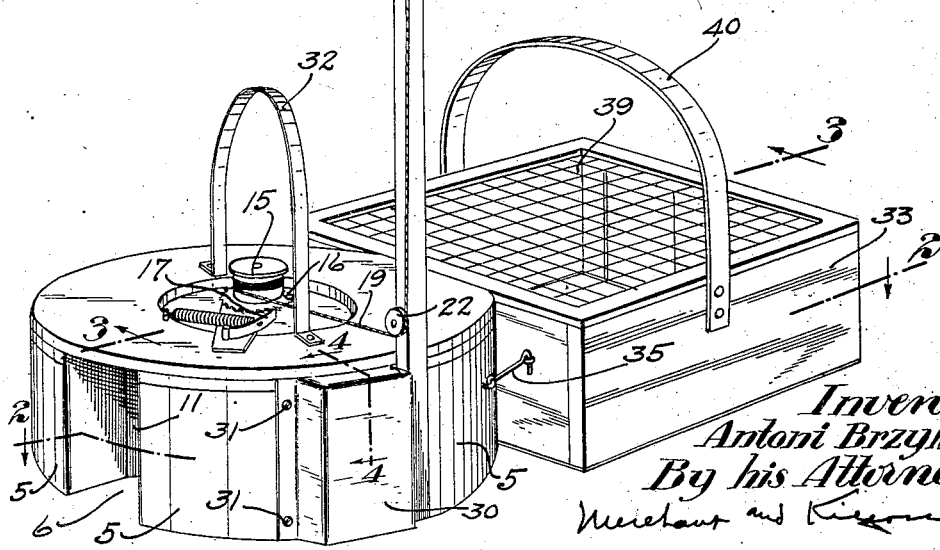
Fig. 2
Fig. 1
Inventor
Antoni Brzykcy
By his Attorneys
Merchant and Kiessen Oct. 11, 1927.  
A. BRZYKCY  
1,645,225  
ANIMAL TRAP  
Filed Feb. 7, 1927  
2 Sheets-Sheet 2
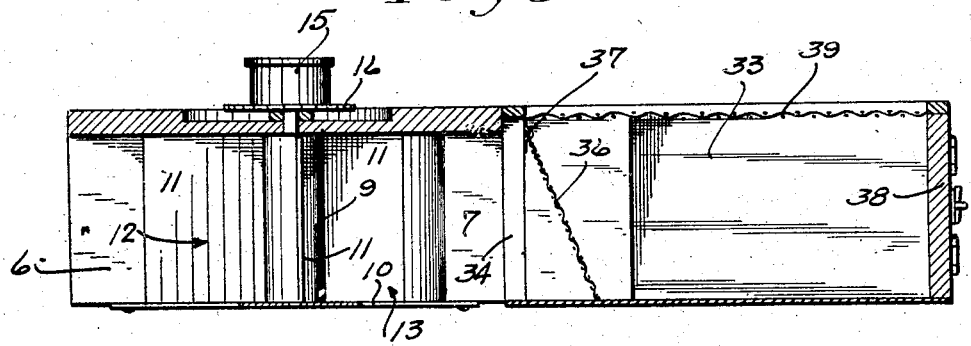
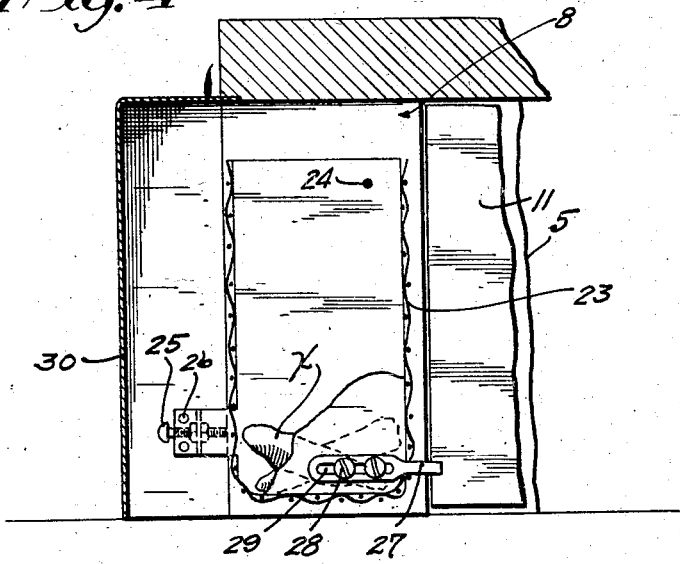
Inventor,  
Antoni Brzykcy  
By his Attorneys Patented Oct. 11, 1927.

1,645,225

UNITED STATES PATENT OFFICE.

ANTONI BRZYKCY, OF MINNEAPOLIS, MINNESOTA.

ANIMAL TRAP.

Application filed February 7, 1927. Serial No. 166,318.

My present invention has for its object to provide an extremely simple and highly efficient animal trap of the type that catches the animal alive, and is automatically reset.

Generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a perspective view of the improved animal trap;

Fig. 2 is a horizontal section taken on the line 2—2 of Fig. 1;

Fig. 3 is a vertical section taken on the line 3—3 of Fig. 1; and

Fig. 4 is a fragmentary detail view in section taken on the line 4—4 of Fig. 1, on an enlarged scale.

The numeral 5 indicates a circular housing having a flat top and an open bottom. In the circular wall of the housing 5 are formed an entrance passage 6, an exit 7, and an aperture 8 for a bait holder, as will presently appear. Said aperture 8 is located between the entrance passage 6 and exit 7. Axially located in the housing 5 is an upright spindle 9 journaled in the top of the housing 5 and a thin metal bearing plate 10 on the bottom of said housing. Rigidly secured to the spindle 9 are a plurality of radial partitions 11, as shown in Fig. 3, which divide the housing 5 into three equal compartments 12, 13, and 14.

Keyed to the upper end of the spindle 9 above the housing 5 is a flanged drum 15, the lower flange of which is in the form of a ratchet wheel 16. A spring-held pawl 17 engages the ratchet wheel 16 to prevent backward rotation of the spindle 9.

For rotating the spindle 9 and the attached partitions 11 in the direction of the arrow marked on Fig. 2, to trap an animal and reset the trap, there is provided a suspended weight 18 attached to a cable 19 secured to the drum 15 and wound thereon. This cable 19 runs over a pulley 20 at the top of a mast 21 on the housing 5 and under a guide sheave 22 on said mast near the bottom thereof.

A bait holder 23 in the form of a metallic basket, the front, back and bottom of which are of a coarse mesh, is suspended from the housing 5 by a hinge rod 24 for radial swinging movement in respect to said housing. By reference to Fig. 4 it will be noted that the hinge rod 24 is located inward of the transverse center of the bait holder 23 so that said basket is held slightly overbalanced to swing inwardly by gravity.

An adjustable screw 25, on a bracket 26 secured to one side of the bait holder 23 near the bottom thereof, is arranged to impinge against the outer wall of the housing 5 and stop the inward swinging movement of said holder, under the action of gravity. On the side of the bait holder 23 nearest the exit 7 is a stop finger 27 which normally projects in the path of movement of the partitions 11 to be successively engaged thereby as they are rotated by the weight 18, and stopped to reset the trap. To adjust the stop finger 27 for different surface contacts with the partitions 11, the same is secured to the bait holder 23 by a pair of screws 28 which extend through a longitudinal slot 29 in said finger.

The aperture 8 outward of the bait holder 23 is closed by a removable flanged metal casing 30 detachably secured to the outer wall of the housing 5 by screws 31. By removing the casing 30, bait $x$ may be placed in the bait holder 23 by dropping the same through the open top thereof. On top of the housing 5 is a handle 32 by which the trap may be carried. By reference to Fig. 2 it will be noted that the entrance passage 6 and bait holder 23 are in the same compartment, to wit: 12, but at the opposite sides thereof.

An animal entering the passage 6, attracted by the sight or smell of the bait $x$ travels through the compartment 12 to the bait holder 23. The purpose of leaving the bottom of the trap open is so that the animal will travel when in the trap, on the same floor on which the trap rests and thus not be frightened. An animal within the compartment 12 attempting to get at the bait $x$ will swing the bait holder 23 inward, which is only lightly held by gravity and thereby moves the stop finger 27 out of the path of movement of the partition 11 engaging the same and thereby release the spindle 9 and partitions 11 and allow the weight 18 to rotate the same. The instant that the trap is tripped by an animal, the partition at the entrance passage 6 will swing past said entrance passage and close the same, thereby cutting off retreat for the animal. This same partition 11 will sweep the animal into the compartment 13 and be stopped by the stop finger 27 which has been reset by the return of the trap holder 23 to normal position, under the action of gravity. It will thus be seen that the trapped animal is caught in the compartment 13 and the trap reset.

At the back of the trap is a rectangular cage 33 having an entrance passage 34 aligned with the exit 7. This cage 33 is detachably secured to the trap by a pair of hooks and eyes 35. A one-way gravity closed open mesh door 36 is hinged at 27 to the cage 33. It will be noted that the door 36 is held in an oblique position by its engagement with the bottom of the cage 33 and can only be opened by a movement into the cage 33. Said cage 33 is provided with a door 38 and the top of said cage is closed by a coarse mesh cover 39.

An animal trapped in the compartment 13, seeing the light through the door 36 moves toward the same and opens said door by pressing thereagainst and enters the cage 33. Said door 36 is immediately returned to closed position by gravity and, as previously stated, cannot be opened by the animal from the inside of said cage. Attached to the cage 33 is a handle 40 by which the same may be carried.

Obviously, the cage 33 may be detached from the trap by releasing the hooks 35 and the animal or animals in said cage destroyed. After the trap has been operated a sufficient number of times to unwind the cable 19 from the drum 15, said cable may be again rewound on the drum by releasing the pawl 17 and turning the spindle 9 either by means of the drum 15 or the partitions 11.

What I claim is:

1. A trap comprising a housing having an entrance passage, radial partitions in the housing mounted to rotate about a vertical axis, a yieldingly positioned bait holder mounted on the housing, power means under strain to rotate the partitions in the direction from the entrance passage to the bait holder, and a stop member arranged to be set by the bait holder in position to be successively engaged by the partitions to stop the same and set the trap with the entrance passage and bait holder between two of said partitions, said stop member being arranged to release the engaged partition by a movement of the bait holder to remove the bait therefrom.

2. The structure defined in claim 1 in which the bait holder is in the form of a gravity positioned basket to which the stop members is attached.

3. The structure defined in claim 1 in which the bait holder is in the form of a gravity positioned basket to which the stop member is attached, in further combination with adjustable stop means for varying the normal position in which the basket is gravity held.

4. The structure defined in claim 1 in which the bait holder is in the form of a gravity positioned basket to which the stop member is attached, said basket being mounted in an aperture in the wall of the housing, and in further combination with a displaceable casing for said aperture outward of the bait holder.

In testimony whereof I affix my signature.

ANTONI BRZYKCY.